United States Patent
Sakakiyama

(10) Patent No.: US 6,634,451 B2
(45) Date of Patent: Oct. 21, 2003

(54) POWER DISTRIBUTION CONTROL SYSTEM FOR A VEHICLE

(75) Inventor: Ryuzo Sakakiyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 18 days.

(21) Appl. No.: 09/984,149

(22) Filed: Oct. 29, 2001

(65) Prior Publication Data

US 2002/0055416 A1 May 9, 2002

(30) Foreign Application Priority Data

Oct. 27, 2000 (JP) ........................................ 2000-329348

(51) Int. Cl.[7] .............................................. B60K 17/00
(52) U.S. Cl. ...................... 180/197; 180/248; 701/69; 701/89
(58) Field of Search .................. 180/197, 233, 180/248, 249, 242; 701/67, 69, 82, 89, 1, 87; 192/54.1; 477/174

(56) References Cited

U.S. PATENT DOCUMENTS

| | | | | |
|---|---|---|---|---|
| 5,002,147 A | * | 3/1991 | Tezuka et al. | 180/197 |
| 5,041,978 A | * | 8/1991 | Nakayama et al. | 701/84 |
| 5,168,955 A | * | 12/1992 | Naito | 180/197 |
| 5,224,044 A | * | 6/1993 | Tamura et al. | 701/91 |
| 5,270,930 A | * | 12/1993 | Ito et al. | 701/69 |
| 5,631,829 A | * | 5/1997 | Takasaki et al. | 701/69 |
| 5,671,144 A | * | 9/1997 | Ryan et al. | 701/84 |
| 5,754,967 A | * | 5/1998 | Inoue et al. | 701/54 |
| 6,094,614 A | * | 7/2000 | Hiwatashi | 701/89 |
| 2002/0045981 A1 | * | 4/2002 | Ichikawa et al. | 701/91 |
| 2002/0107628 A1 | * | 8/2002 | Sakakiyama | 701/89 |
| 2003/0079954 A1 | * | 5/2003 | Murakami et al. | 192/82 T |

FOREIGN PATENT DOCUMENTS

| | | | | |
|---|---|---|---|---|
| JP | 61-37541 | | 2/1986 | |
| JP | 62059126 A | * | 3/1987 | ........... B60K/17/34 |
| JP | 01094025 A | * | 4/1989 | ......... B60K/17/348 |
| JP | 01114523 A | * | 5/1989 | ........... B60K/17/35 |
| JP | 02290737 A | * | 11/1990 | ........... B60K/23/08 |
| JP | 2002127772 A | * | 5/2002 | ......... B60K/17/348 |

\* cited by examiner

Primary Examiner—Lesley D. Morris
Assistant Examiner—Daniel Yeagley
(74) Attorney, Agent, or Firm—Smith, Gambrell & Russell, LLP

(57) ABSTRACT

A power distribution control system for a vehicle, in which a front/rear drive-force distribution control unit computes a torque-response-torque, a revolution-difference-response-torque and a yaw-rate feed back torque. When a torque down command by a traction control is not outputted to an engine control unit, and a braking force control is not active, a transfer clutch torque is setted as defined by a predetermined equation.

12 Claims, 4 Drawing Sheets

POWER DISTRIBUTION CONTROL SYSTEM FOR A VEHICLE

BACKGROUND OF THE INVENTION

The present invention relates to a power distribution control system in use for a vehicle (i.e. a 4 wheel-drive vehicle), which performs an appropriate control when a traction control unit; and a braking force control unit operate for controlling a vehicle motion behavior.

Recent vehicles are provided with a vehicle motion control unit, such as a traction control unit or a braking force control unit. The traction control unit secures improvements of acceleration, maneuvering stability and vehicle motion stability, when the vehicle starts to move by suppressing drive wheel spin. The braking force control unit appropriately controls a vehicle motion when the vehicle turns by applying a braking force to the wheel selected as intended.

Where the vehicle motion control unit is incorporated into the 4-wheel drive vehicle, the control by the vehicle motion control unit interferes with the control by a power distribution control system for the 4-wheel drive vehicle. Sometimes, this brings about an unfavorable situation for the vehicle. To cope with this, there is a proposal of a 4-wheel drive vehicle in which the 4-wheel drive is forcibly switched to a 2-wheel drive when the slip control is active (Refer to Japanese Patent Unexamined Publication No. Sho.61-37541).

However, when the 4-wheel drive is switched to the 2-wheel drive at the instant that the slip control becomes active, the running performance will remarkably be deteriorated. When the 4-wheel drive is switched to the 2-wheel drive, the vehicle characteristics abruptly change, and the driver may perceive a vastly uncomfortable drive feeling.

SUMMARY OF THE INVENTION

Accordingly, an object of the present invention is to provide a power distribution control system in use for a 4-wheel drive vehicle, in which even when a vehicle motion control unit operates and performs a vehicle motion control, an optimum power distribution control is continued without any excessive interference with the vehicle motion control, whereby an excellent drivability is secured without giving the driver any uncomfortable feeling.

The above object can be achieved by a power distribution control system for a vehicle(i.e. 4-wheel drive vehicle), according to a first aspect of the present invention, comprising a vehicle motion controller for controlling a motion of the vehicle, a power distribution controller and a clutch of a torque transmission capacity variable type operated by an operating torque set by the power distribution controller. The power distribution controller includes first torque setting means, second torque setting means and operating torque setting means. The first torque setting means computes a torque-response-torque that is based on an input torque received from a drive source and distributed to front and rear shafts. The second torque setting means computes a revolution-difference-response-torque based on a revolution-difference between a front shaft and a rear shaft. The operating torque setting means computes the operating torque using at least the torque-response-torque and the revolution-difference-response-torque. When the vehicle motion controller operates, the operating torque setting means computes the operating torque except the revolution-difference-response-torque.

The object of the invention may also be achieved by a power distribution control system for a vehicle (i.e. 4-wheel drive vehicle), according to a second aspect of the present invention, comprising a vehicle motion controller for controlling a motion of the vehicle and a clutch of a torque transmission capacity variable type operated by an operating torque set by the power distribution controller. The power distribution controller includes first torque setting means, second torque setting means, yaw-rate feedback torque setting means and operating torque setting means. The first torque setting means computes a torque-response-torque that is based on an input torque received from a drive source and distributed drive power to the front and rear shafts. The second torque setting means computes a revolution-difference-response-torque based on a revolution-difference between a front shaft and a rear shaft. The yaw-rate feedback torque setting means for computing a yaw rate feedback torque is based on a yawing state of the vehicle. The operating torque setting means computes the operating torque using at least the torque-response-torque, the revolution-difference-response-torque and the yaw rate feedback torque. When the vehicle motion control means operates, the operating torque setting means computes the operating torque except the revolution-difference-response-torque and the yaw rate feedback torque.

The object of the invention may also be achieved by a power distribution control system for a vehicle (i.e. 4-wheel drive vehicle), according to a third aspect of the present invention, whereby in the first or second aspect of the present invention, the vehicle motion controller controls a motion of the vehicle as intended by detecting a tendency of over steer of the vehicle and a tendency of understeer of the vehicle, and the operating torque setting means computes the operating torque; when the vehicle motion control means operates, in such a manner that correction quantities based on the oversteer and understeer tendency are added to the operating torque.

The object of the invention may also be achieved by a power distribution control system for a vehicle (i.e. 4-wheel drive vehicle), according to a fourth aspect of the present invention, whereby in the first or second aspect of the present invention, each of the correction quantities is selected depending on at least either of a vehicle speed and a road surface friction coefficient.

The object of the invention may also be achieved by a power distribution control system for a vehicle (i.e. 4-wheel drive vehicle), according to a fifth aspect of the present invention, whereby in the first or second aspect of the present invention, the operating torque setting means introduces a prescribed delay into a variation of the operating torque, when the operating torque is varied with the operation of the vehicle motion controller.

In the power distribution control system, according to the first aspect of the invention, the power distribution control means computes a torque-response-torque, which is based on an input torque received from a drive source for distributing the drive power to the front and rear wheels, by the first torque setting means. The power distribution control means computes a revolution-difference-response-torque based on a revolution-difference between the front shaft and the rear shaft by the second torque setting means. The power distribution control means computes operating torque using at least the torque-response-torque and the revolution-difference-response-torque by the differential torque setting means. Then a torque transmission capacity variable type clutch means is operated by the operating torque, so as to distribute drive power to the front and rear wheels. When the vehicle motion control means operates for controlling a vehicle motion as intended, the operating torque setting means of the power distribution control means computes the operating torque, except the revolution-difference-response-torque. The computed operating torque controls the torque transmission capacity variable clutch means. Accordingly, even when the vehicle motion control unit operates and performs a vehicle motion control, an optimum power distribution control is continued without any excessive interference with the vehicle motion control, whereby an excellent drivability is secured without giving the drive any uncomfortable feeling.

In the power distribution control system, according to the second aspect of the present invention, the power distribution control means computes a torque-response-torque, which is based on an input torque received from a drive source for distributing the drive power to the front and rear wheels by the first torque setting means. The power distribution control means computes a revolution-difference-response-torque based on a revolution-difference between the front shaft and the rear shaft by the second torque setting means. The power distribution control means computes a yaw rate feedback torque based on a yawing state of the vehicle by the yaw-rate feedback torque setting means. The power distribution control means computes a operating torque using at least the torque-response-torque by the operating torque setting means. Then, the torque transmission capacity variable clutch means is operated by the operating torque, to distribute drive power to the front and rear wheels. When the vehicle motion control means operates for controlling a vehicle motion as intended, the operating torque setting means of the power distribution control means computes the operating torque, except the revolution-difference-response-torque and the yaw rate feedback torque. The computed operating torque controls the torque transmission capacity variable type clutch means. Accordingly, even when the vehicle motion control unit operates and performs a vehicle motion control, an optimum power distribution control is continued without any excessive interference with the vehicle motion control, whereby an excellent drivability is secured without giving the drive any uncomfortable feeling.

In the power distribution control system, according to the third aspect of the present invention, when the vehicle motion control means controls a motion of the vehicle as intended by detecting a tendency of oversteer of the vehicle and a tendency of understeer of the vehicle, and the operating torque setting means computes the operating torque in such a manner that correction quantities based on the oversteer or understeer tendency are added to the operating torque when the vehicle motion control means operates. The vehicle motion control means also prevents the oversteer or the understeer tendency.

In the power distribution control system, according to the fourth aspect of the present invention, each correction quantity is selected depending on at least either a vehicle speed or a road surface friction coefficient. According to this correction quantity, the control precision is higher.

In the above power distribution control systems, according to the fifth aspect of the present invention, the operating torque setting means introduces a delay into a variation of the operating torque, when the operating torque is varied by the operation of the vehicle motion control means. A variation of the operating torque with the operation of the vehicle motion control means is made as gentle as possible, so that a variation of the vehicle characteristics caused by the variation of the power distribution to the front and rear wheels is made gentle.

The preferred embodiments of the present invention will be described with reference to accompanying drawings. FIGS. 1 to 4 are diagrams showing the preferred embodiments of the present invention. FIG. 1 is a block diagram showing an arrangement of an overall power distribution control system of a vehicle. FIG. 2 is a functional block diagram showing a front/rear drive force distribution control system. FIG. 3 graphically represents a variation of transfer clutch torque when a traction control operates. FIG. 4 is a flow chart of a front/rear drive force distribution control.

DETAILED DESCRIPTION OF THE INVENTION

Figure 1:
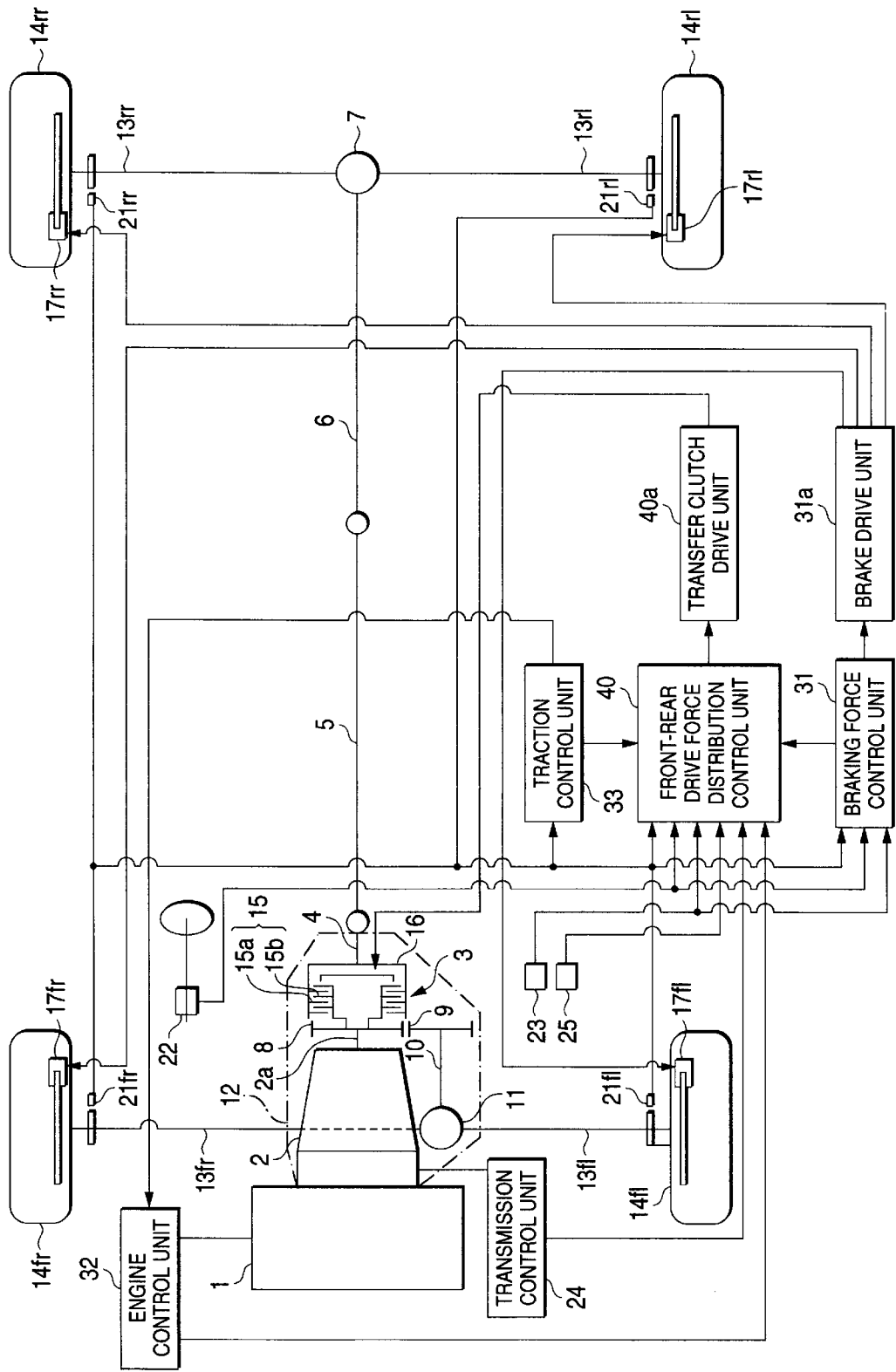
FIG. 1 is a block diagram showing an arrangement of an overall power distribution control system of a vehicle.

In the FIG. 1, reference numeral 1 indicates an engine disposed at a front part of a vehicle. A drive force generated by the engine 1 is transmitted from an automatic transmission apparatus 2 (including a torque converter), which is disposed at a rear portion of the engine 1, to a transfer 3 through an output shaft 2a of the transmission apparatus 2.

Further, the drive force transmitted to the transfer 3 is inputted to a rear-wheel final reduction gear device 7, through a rear drive shaft 4, a propeller shaft 5, and a drive pinion shaft part 6. The drive force is also inputted to a front-wheel final reduction gear device 11, through a reduction drive gear 8, a reduction driven gear 9, and a front drive shaft 10 serving as a drive pinion shaft. The automatic transmission apparatus 2, the transfer 3, and the front-wheel final reduction gear device 11 are all provided in a case 12.

A drive force inputted to the rear-wheel final reduction gear device 7 is transmitted through a left rear-wheel drive shaft 13rl to a left rear-wheel 14rl, and is transmitted through a right rear-wheel drive shaft 13rr to a right rear-wheel 14rr. A drive force input to the front wheel final reduction gear device 11 is transmitted to a left front-wheel 14fl through a left front-wheel drive shaft 13fl, and is transmitted to a right front-wheel 14fr through a right front-wheel drive shaft 13fr.

The transfer 3 includes a wet-type multiple disk clutch 15 (transfer clutch) and a transfer piston 16. The wet-type multiple disk clutch 15 functions as a torque capacity variable type clutch in which drive plates 15a disposed at a side of the reduction drive gear 8 and driven plates 15b disposed a side of the rear drive shaft 4 are alternately arranged. The transfer piston 16 varies a transfer clutch torque of a transfer clutch 15. Thus, the vehicle of the embodiment is the 4-wheel drive vehicle of a front-engine/front drive basis in which a torque distribution ratio between the front and rear wheels is varied over a range from 100:0 to 50:50 by controlling a pressing force by the transfer piston 16 and a transfer clutch torque of the transfer clutch 15.

The pressing force of the transfer piston 16 is generated by a transfer clutch drive unit 40a having a hydraulic circuit including a plurality of solenoid valves. A control signal for driving the transfer clutch drive unit 40a (=an output signal that is applied to the solenoid valve in accordance with a transfer clutch torque) is outputted from a front/rear drive force distribution control unit 40 which will be described.

Reference numeral 31a designates a brake drive unit of the vehicle. A master cylinder (not shown), which is coupled to a brake pedal operated by a driver, is coupled to the brake drive unit 31a. When the driver operates the brake pedal, the master cylinder operates to introduce a braking pressure into the wheel cylinders (left front-wheel wheel cylinder 17fl, right front-wheel wheel cylinder 17fr, left rear-wheel wheel cylinder 17rl, right rear-wheel wheel cylinder 17rr) of the four wheels 14fl, 14fr, 14rl and 14rr, and those four wheels are braked.

The brake drive unit 31a is a hydraulic unit including a pressure source, a pressure-reducing valve, and a pressure-increasing valve. Also in other cases of the braking operation by the driver, brake pressures are independently applied to the wheel cylinders 17fl, 17fr, 17rl, 17rr individually in accordance with an input signal from a braking force control unit 31 to be described later.

A signal outputted from a traction control unit 33 (to be described later) is inputted to an engine control unit 32 for carrying out various controls of the engine 1, such as fuel injection control.

The braking force control unit 31 and the traction control unit 33 are provided as vehicle motion control means. The front/rear drive force distribution control unit 40 is provided as drive force distribution control means.

The vehicle contains sensors and others for detecting various parameters required for the controls by the control units 31, 33 and 40. Specifically, wheel speeds ωfl, (ωfr, ωrl, ωrr of the wheels 14fl, 14fr, 14rl, 14rr are detected by wheel speed sensors 21fl, 21fr, 21rl and 21rr, and inputted to the control units 31, 33 and 40. A steering angle θH is detected by a steering angle sensor 22. A yaw rate γ is detected by a yaw rate sensor 23. Then the outputted signals from those sensors are inputted to the braking force control unit 31 and the front/rear drive force distribution control unit 40. The engine control unit 32 outputs the number of engine revolutions Ne and an engine torque Te to the front/rear drive force distribution control unit 40. A transmission control unit 24 for carrying out a speed change control of the automatic transmission apparatus 2 outputs a signal representing the number of turbine rotation Nt and a signal representing a gear ratio "i" to the front/rear drive force distribution control unit 40.

A road surface μ estimating device 25 is further mounted on the vehicle. The road surface μ estimating device 25 estimates a friction coefficient (road surface μ) of the road surface by a road surface μ estimating method as disclosed in Japanese Patent Unexamined Publication No. Hei 8-2274 filed by the applicant of the present patent application. An estimated road surface μ value μe is inputted to the front/rear drive force distribution control unit 40. The road surface μ estimating method used in the road surface μ estimating device 25 will be described briefly. Cornering powers of the front and rear wheels are expanded into a non-linear region and estimated in this region by using an equation of lateral motion of the vehicle, with a vehicle speed V, a steering angle θ and a yaw rate γ as parameters. The road surface μ is estimated in accordance with road conditions, based on a ratio of the cornering powers of the front and the rear wheels, which is estimated for the equivalent cornering powers of the front and rear wheels on a high μ road.

The braking force control unit 31 controls braking forces as in the following way in accordance with wheel speeds ωfl, ωfr, ωrl, ωrr derived from the wheel speed sensors 21fl, 21fr, 21rl and 21rr, a steering angle θH from the steering angle sensor 22, a yaw rate γ from the yaw rate sensor 23, and vehicle data. The braking force control unit 31 computes a differentiated value of a target yaw rate, a differentiated value of an estimated yaw rate on a low road surface μ, and a difference between those differentiated values, and computes a difference between a actual yaw rate and a target yaw rate. Then, based on the se computed values, the braking force control unit 31 computes a target control force for correcting a tendency to understeer or to oversteer of the vehicle. In this case, to correct the tendency to understeer of the vehicle, the rear wheel on the inner side as viewed in the vehicle turning direction is selected as a braking wheel to which a braking force is applied. To correct the tendency to oversteer of the vehicle, the front-wheel on the outer side as viewed in the vehicle turning direction is selected as a braking wheel to which a braking force is applied. A control signal is outputted to the brake drive part 31a to apply a target braking force to the selected wheel, thereby effecting a braking force control. An operating signal of the braking force control unit 31, viz., a signal indicating as to whether it is operating to correct the tendency to understeer or it is operating to correct the tendency to oversteer, is also outputted to the front/rear drive force distribution control unit 40.

The traction control unit 33 detects slip ratios of the individual wheels based on the wheel speeds ωfl, ωfr, ωrl, ωrr derived from the wheel speed sensors 21fl, 21fr, 21rl and 21rr. When the slip ratio exceeds a determined of predetermined slip ratio, the traction control unit 33 sends a predetermined control signal to the engine control unit 32 to perform a torque down control of the engine 1. When the traction control unit 33 operates, a signal indicating that the traction control unit 33 is active, is outputted to the front/rear drive force distribution control unit 40.

The front/rear drive force distribution control unit 40 receives wheel speeds ωfl, ωfr, ωrl, ωrr from the wheel speed sensors 21fl, 21fr, 21rl and 21rr, an steering angle θH from the steering angle sensor 22, a yaw rate γ from the yaw rate sensor 23, the number of engine revolutions Ne and an engine torque Te from the engine control unit 32, a number of turbine rotation Nt and a gear ratio "i" from the transmission control unit 24, an estimated road surface μ value μe from the road surface μ estimating device 25, an on/off signal indicating whether the traction control is active or not, and an understeer-tendency restricting signal, an oversteer-tendency restricting signal, or a non-operation signal from the braking force control unit 31.

Then, the front/rear drive force distribution control unit 40 computes a torque-response-torque Tt, a revolution-difference-response-torque Ts, and a yaw-rate feedback torque Ty based on those input signals, and computes a transfer clutch torque Ttr based on those computed torque values.

Figure 2:
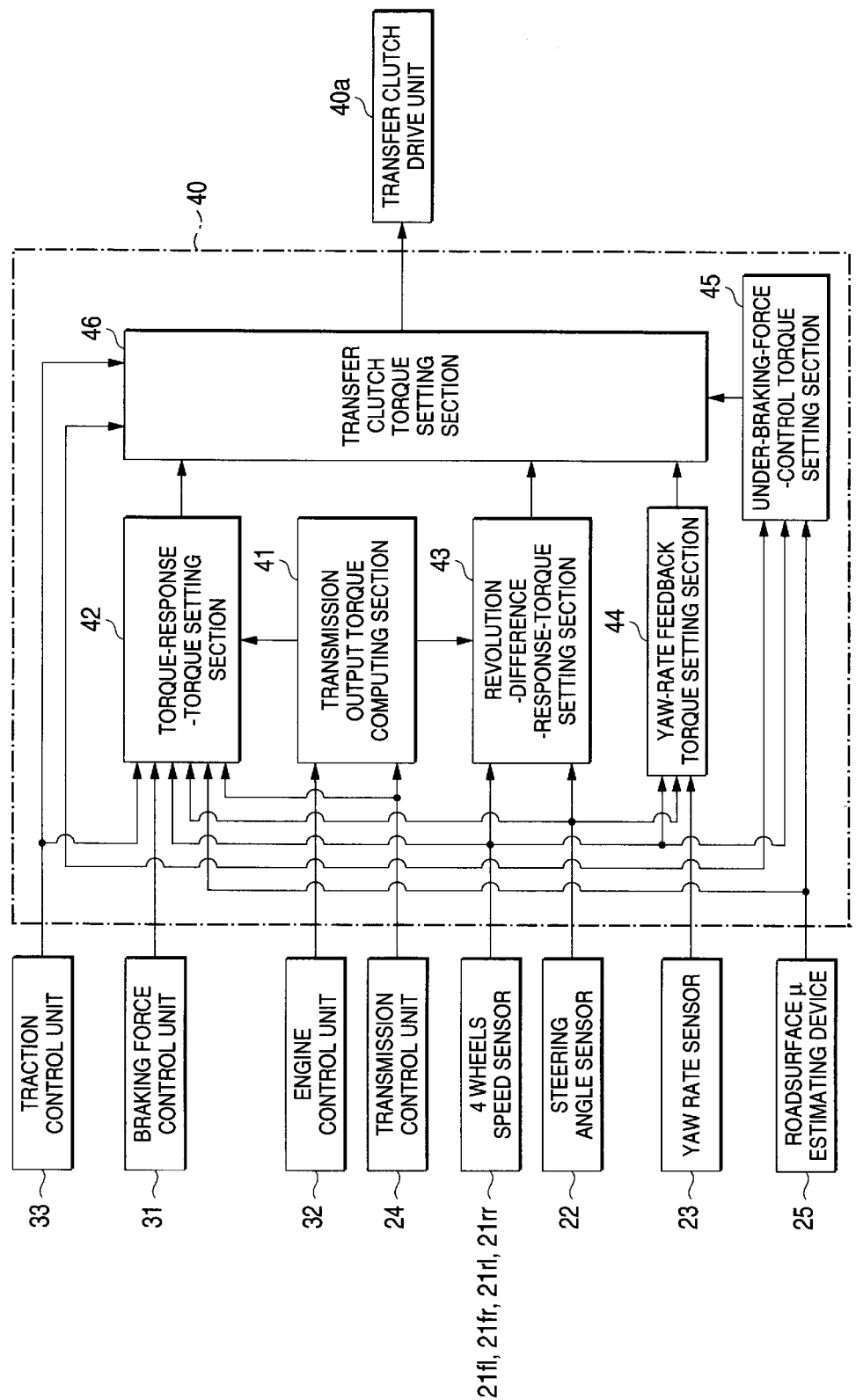
FIG. 2 is a functional block diagram showing a front/rear drive force distribution control unit.

The front/rear drive force distribution control unit 40, as shown in FIG. 2, consists of a transmission output torque computing unit 41, a first torque setting unit 42, a second torque setting unit 43, a yaw-rate feedback torque setting unit 44, an third torque setting unit 45, and a transfer clutch torque setting unit 46.

The transmission output torque computing unit 41 receives the number of engine revolutions Ne, an engine torque Te, a number of turbine rotation Nt, and a gear ratio "i", and computes a transmission output torque To by using the equation (1) as follows, and outputs the transmission output torque To to the first torque setting unit 42 and the second torque setting unit 43.

$$To = Te \cdot t \cdot i \quad (1)$$

In the above equation, "t" indicates a preset torque ratio of the torque converter. This value is obtained from a map containing a rotational speed ratio e (=Nt/Ne) of the torque converter and a torque ratio "t" of the torque converter.

The first torque setting unit 42 receives wheel speeds ωfl, ωfr, ωrl, ωrr, steering angle θH, gear ratio "i", estimated road surface μ value μe, an on/off signal indicating whether the traction control is on or off, and an understeer-tendency restricting signal, an oversteer-tendency restricting signal, or a non-operation signal from the braking force control unit 31, and a transmission output torque To. Then, the first torque setting unit 42 computes a torque-response-torque Tt, and outputs the resultant to the transfer clutch torque setting unit 46.

Specifically, the first torque setting unit 42 selects a predetermined drive power distribution rate Ai of the rear wheels for each gear ratio "i", when each case of that the traction control is active, and case of that the braking force control is active (the understeer tendency is under restriction, the oversteer tendency is under restriction), and computes the torque-response-torque Tt by using the rear-wheel drive power distribution rate Ai and the transmission output torque To.

$$Tt = Ai \cdot To \quad (2)$$

The torque-response-torque Tt is corrected to compensate a torque decrease according to a steering angle σf (=θH/n, wherein "n" is a steering gear ratio) to lessen the influence by a dragging torque by the steering, and corrected according to the vehicle speed V (e.g., an average value of the wheel speeds ωfl, ωfr, ωrl, ωrr)

$$Tt = f(\sigma f) \cdot g(V) \cdot Tt \quad (3)$$

The torque-response-torque Tt corrected by the equation (3) is limited so as not to be below a predetermined lower limit value for each road surface μ, and outputs the resultant torque to the transfer clutch torque setting unit 46. Thus, the first torque setting unit 42 is provided as torque-response-torque setting means.

The second torque setting unit 43 receives the wheel speeds ωfl, ωfr, ωrl, ωrr, the steering angle θH, and the transmission output torque To. The second torque setting unit 43 computes a revolution-difference-response-torque Ts by using an equation (4), and outputs the resultant to the transfer clutch torque setting unit 46. That is, the second torque setting unit 43 is provided as revolution-difference-response-torque setting means.

$$Ts = KT0 \cdot f(\Delta N - \Delta N0) \quad (4)$$

wherein

ΔN=ωr−ωf,
ωf=(ωfl+ωfr)/2
ωr=(ωrl+ωrr)/2
ωf=actual rotational speed of the front shaft
ωr=actual rotational speed of the rear shaft
ΔN0 is a rotational speed difference (basic rotational speed difference) which is inevitably caused by a relationship between the steering angle σf and the vehicle speed V. It is computed in the following way by using a vehicle motion model.

$$\text{Turning radius } \rho cg \text{ of the vehicle gravity center} = (1 + A \cdot V^2) \cdot (L/(\theta H/n)) \quad (5)$$

$$\text{Slip angle } \beta cg \text{ of the vehicle gravity center} = ((1 - (m/(2 \cdot L)) \cdot (Lf/(Lr \cdot Kr)) \cdot V^2)/(1 + A \cdot V^2)) \cdot (Lr/L) \cdot (\theta H/n) \quad (6)$$

wherein
A: stability factor
m: vehicle mass
L: wheel base
Lf: distance between the front shaft and the vehicle gravity center
Lr: distance between the rear shaft and the vehicle gravity center
From the equations (5) and (6), we have $$\text{Turning radius } \rho f \text{ of the front shaft} = \rho cg + Lf \cdot (\sin(\beta cg)) \quad (7)$$

$$\text{Turning radius } \rho r \text{ of the rear shaft} = \rho cg - Lr \cdot (\sin(\beta cg)) \quad (8)$$

Thence, $$\text{Basic rotational speed } \omega f0 \text{ of the front shaft} = V \cdot (\rho f/\rho cg) \quad (9)$$

$$\text{Basic rotational speed } \omega r0 \text{ of the rear shaft} = V \cdot (\rho r/\rho cg) \quad (10)$$

By using the above equations, the basic rotational speed difference ΔN0 viz., ΔN0 =ωr0−ωf0, can be computed. A difference (ΔN−ΔN0) indicates a quantity of slip actually occurring.

KT0 is a presetted proportional coefficient depending on the transmission output torque To, and the value becomes larger with an increase of the transmission output torque To so as to decrease the difference rotational speed.

The yaw-rate feedback torque setting unit 44 receives the wheel speeds ωfl, ωfr, ωrl, ωrr, the steering angle θH, and yaw rate γ. And the yaw-rate feedback torque setting unit 44 compares an actual yaw rate to a predetermined target yaw rate γ' of the vehicle body, which is determined by the vehicle speed V and the steering angle θf, and computes a yaw rate feedback torque Ty to be increased or decreased so that these yaw rate are equal to each other. Finally, the yaw-rate feedback torque setting unit 44 outputs the computed yaw rate feedback torque Ty to the transfer clutch torque setting unit 46. Thus, the yaw-rate feedback torque setting unit 44 is provided as yaw-rate feedback torque setting means.

Specifically, the target yaw rate γ' is computed by using the following equation (11).

$$\gamma'=(1/(1+T \cdot s)) \cdot (1/(1+(1+A \cdot V^2))) \cdot (V/L) \cdot \theta f \quad (11)$$

wherein T is a time constant, and s is a Laplace operator.

Then, a yaw rate difference Δγ(=γ'−γ) (γ'=target yaw rate and γ=actual yaw rate) is computed, and the yaw rate feedback torque Ty is selected so that the yaw rate difference Δγ is reduced to zero (0).

The third torque setting unit 45 receives wheel speeds ωfl, ωfr, ωrl, ωrr, an estimated road surface μ value μe, and an understeer-tendency restricting signal, an oversteer-tendency restricting signal, or a non-operation signal for the braking force control. The third torque setting unit 45 computes a correction quantity Ttryh of the transfer clutch torque Ttr when the braking force control unit 31 is restricting the understeer tendency or oversteer tendency, and outputs the computed correction quantity Ttryh to the transfer clutch torque setting unit 46.

The correction quantity Ttryh may be computed in the following way.

When the braking force control unit 31 is restricting the understeer, a predetermined minute torque ΔT is multiplied by a constant Kus to produce a correction quantity Ttryh.

$$Ttryh=Kus \cdot \Delta T \quad (12)$$

wherein the constant Kus is selected depending on the vehicle speed V and the estimated road surface μ value μe. The constant Kus becomes larger with the increase of the vehicle speed V, and becomes smaller with the decrease of the estimated road surface μ value μe. In other words, as the vehicle speed V increases, the correction becomes larger to swiftly stabilize the vehicle behavior. When the estimated road surface μ value μe is small, a variation of the correction quantity Ttryh is reduced to be small in order to prevent a quick variation of the vehicle characteristics. As a tendency to the understeer becomes strong, the correction is made toward the 4-wheel drive of 50:50 between the front and rear wheels, viz., so as to increase the transfer clutch torque Ttr.

When the braking force control unit 31 is restricting the oversteer, a predetermined minute torque ΔT is multiplied by a constant Kos to produce a correction quantity Ttryh.

$$Ttryh=Kos \cdot \Delta T \quad (13)$$

wherein the constant Kos, as in the case of the constant Kus, is selected depending on the vehicle speed V and the estimated road surface μ value μe. The constant Kus becomes larger with the increase of the vehicle speed V, and becomes smaller with the decrease of the estimated road surface μ value μe. As a tendency to the oversteer becomes strong, the correction is made toward the 2-wheel drive of 100:0 between the front and rear wheels, viz., so as to decrease the transfer clutch torque Ttr.

Since the FF basis 4-wheel drive vehicle is discussed in the embodiment, the transfer clutch torque Ttr is varied as mentioned above. In the case of the 4-wheel drive vehicle based on the front engine/rear drive (FR), the variation of the transfer clutch torque is naturally reverse in direction to that in the above-mentioned case.

The transfer clutch torque setting unit 46 receives an on/off signal indicating whether or not a torque down command by the traction control is outputting to the engine control unit 32, an understeer-tendency restricting signal, an oversteer-tendency restricting signal, or a non-operation signal for the braking force control, and signals representative of torque-response-torque Tt, revolution-difference-response-torque Ts, and yaw rate feedback torque Ty, and if necessary, it reads the computed correction quantity Ttryh.

Based on those signals received, the transfer clutch torque setting unit 46 sets the transfer clutch torque Ttr as in the following cases, and outputs the resultant to the transfer clutch drive part 40a. Thus, the transfer clutch torque setting unit 46 is provided as transfer clutch torque setting means.

Where a torque down command by the traction control is not outputted to the engine control unit 32 and the braking force control is not active, the transfer clutch torque Ttr is setted as given below.

$$Ttr=Tt+Ts+Ty \quad (14)$$

Where a torque down command by the traction control is outputted to the engine control unit 32 and the braking force control is not active, the transfer clutch torque Ttr is setted as given below.

$$Ttr=Tt \quad (15)$$

When the braking force control is active (irrespective of the outputting of the torque down command by the traction control), the transfer clutch torque Ttr is set as given by the following equation, by using a correction quantity Ttryh, which is varied and set depending on whether the braking force control is restricting the understeer tendency or the oversteer tendency.

$$Ttr=Tt+Ttryh \quad (16)$$

Thus, even if the braking force control unit 31 and the traction control unit 33 operate, the transfer clutch torque Ttr is setted except only a torque component, which may interfere with those control quantities and the power distribution control is carried out. Accordingly, an optimum power distribution control is continued without any excessive interference with the braking force control unit 31 and the traction control unit 33, whereby an excellent drivability is maintained without giving the driver any uncomfortable feeling.

Figure 3:
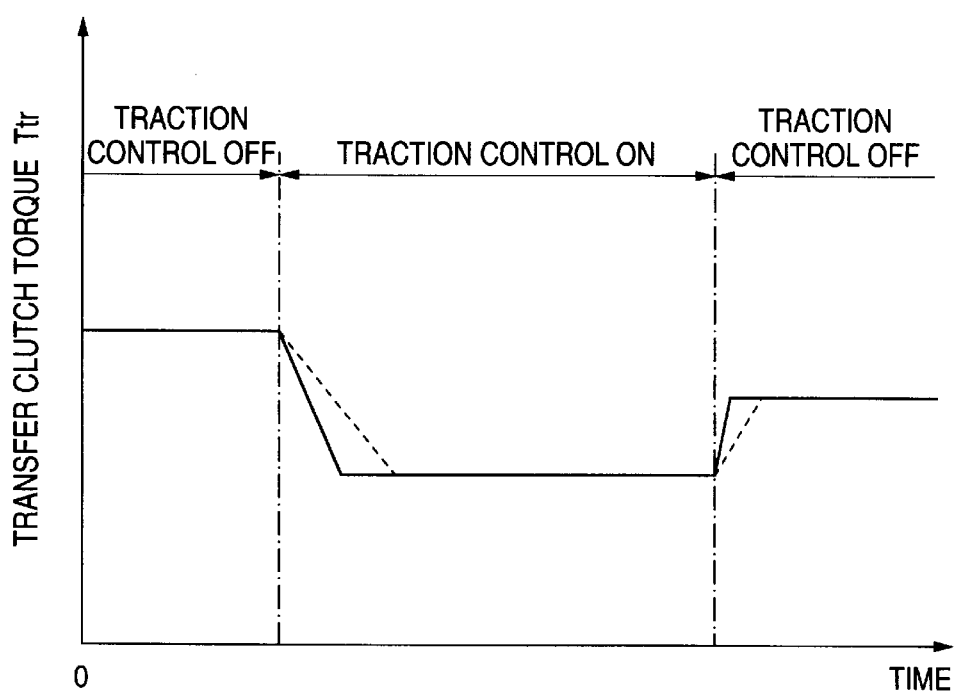
FIG. 3 graphically represents a variation of transfer clutch torque when a traction control operates.

When the transfer clutch torque Ttr is varied with operation and non-operation of the braking force control unit 31 and the traction control unit 33, a delay is introduced into a variation of the transfer clutch torque Ttr as shown in FIG. 3.

This is done by gradually incrementing a ratio of the transfer clutch torque Ttr, which is computed at the present computing step, to the transfer clutch torque Ttr, which is computed at the preceding computing step, as described below. A transfer clutch torque Ttrs finally outputted to the transfer clutch drive part 40*a* is computed by $$Ttrs = (1-kts) \cdot Ttrn-1 + kts \cdot Ttrn \quad (17)$$

wherein Ttrn−1: transfer clutch torque computed at the preceding computing step

Ttrn: transfer clutch torque computed at the present computing step constant kts: 0<kts<1, and the kts is determined depending on the steering angle θf, the vehicle speed V, and the estimated road surface $\mu$ value $\mu e$. For example, where the steering angle θf is large, the vehicle speed V is high and the estimated road surface $\mu$ value $\mu e$ is high. The constant kts is selected to be large, whereby a varying rate of the transfer clutch torque Ttr is increased. Thus, the way of varying the transfer clutch torque Ttr by the operation/non-operation of the braking force control unit 31 and the traction control unit 33 is changed according to running conditions and driving circumstances. By so doing, there is no chance that the transfer clutch torque Ttr abruptly changes, and hence the control shifts to natural and optimum control.

Figure 4:
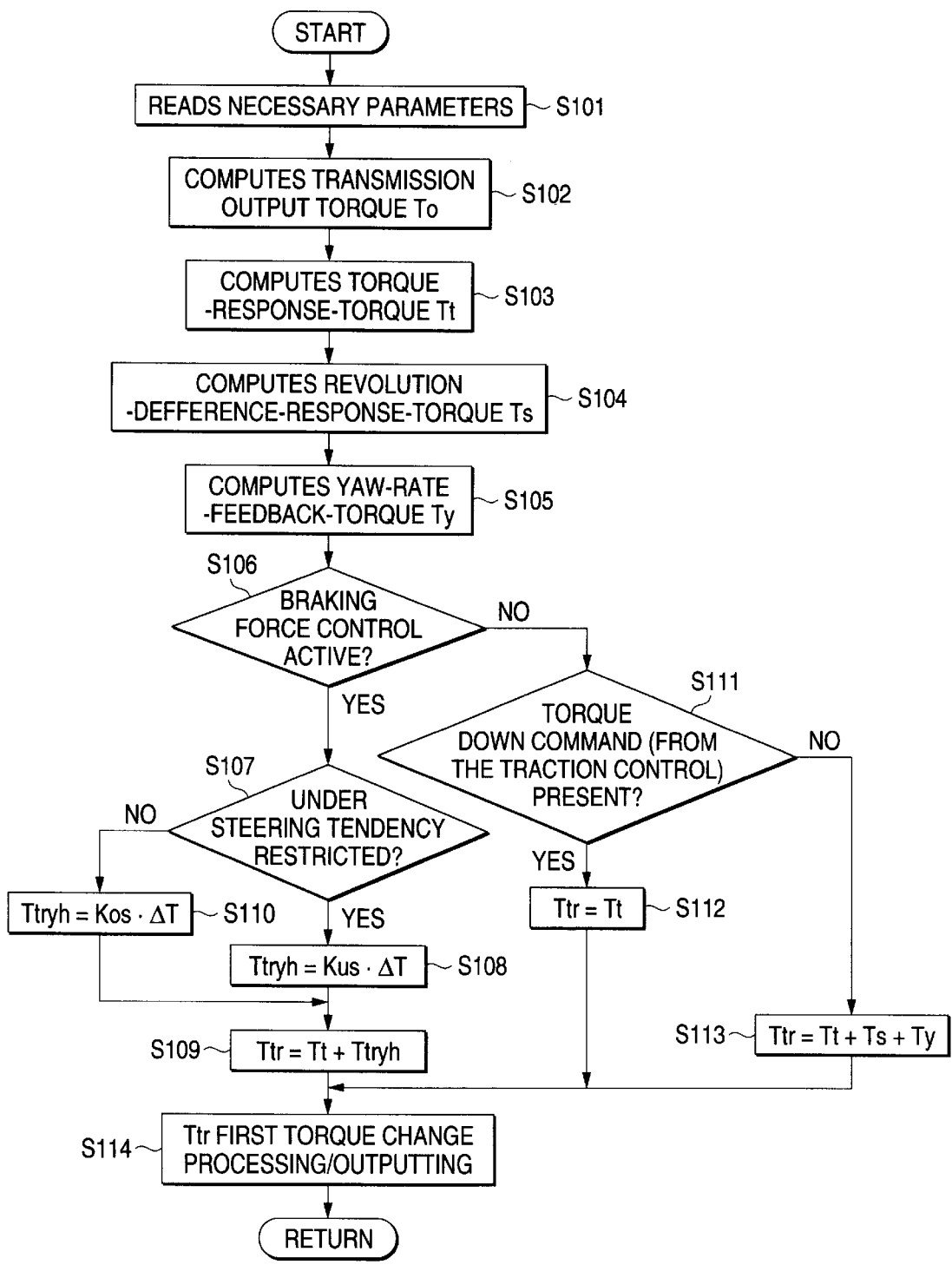
FIG. 4 shows a flow of a front/rear drive force distribution control.

A front/rear drive force distribution control, according to the embodiment, will be described with reference to a flow chart shown in FIG. 4. A program of the front/rear drive force distribution control is repeated at predetermined time intervals. In a step (abbreviated as "S") 101, the program reads necessary parameters.

Then, the program advances to a S102. In this step, the transmission output torque computing unit 41 computes the transmission output torque Tobyusing the equation (1). Then, the program advances to a step S103. In this step, the first torque setting unit 42 sets a torque-response-torque Tt by using the equation (3) and limiting it by the lower limit value for each road surface $\mu$.

The program further advances to a step S104. In this step, the second torque setting unit 43 computes a revolution-difference-response-torque Ts by using the equation (4), and the program advances to a step S105, where the yaw-rate feedback torque setting unit 44 sets a yaw rate feedback torque Ty.

Thereafter, the program advances to a step S106. In this step, it judges and identifies the signal for the braking force control by the braking force control unit 31 indicating that the understeer tendency is being restricted, the oversteer tendency is being restricted or the braking force control is not active. If the braking force control is restricting the understeer or the oversteer, the program goes to a step S107. If the braking force control is not active, the program proceeds to a step S111.

When the program proceeds to the step S107 in a state that the braking force control is active, the program judges as to whether or not the understeer tendency is under restriction. If the understeer tendency is under restriction, the program goes to a step S108. In this step, the third torque setting unit 45 computes a correction quantity Ttryh by using the equation (12). Thereafter, the program advances to a step S109 where the transfer clutch torque setting unit 46 sets a transfer clutch torque Ttr by using an equation (16), viz. Ttr=Tt+Ttryh.

If the understeer tendency is not under restriction, viz., the oversteer tendency is under restriction (step 107), the program goes to a step S110. In this step, the third torque setting unit 45 computes a correction quantity Ttryh by using the equation (13). Thereafter, the program advances to a step S109 in which the transfer clutch torque setting unit 46 sets a transfer clutch torque Ttr by using the equation (16).

When the program judges that the braking force control is not active (S106), and advances to a step S111, and in this step, it judges whether a torque down command by the traction control is outputting to the engine control unit 32 or not.

If the torque down command by the traction control is outputting to the engine control unit 32, the program advances to a step S112. In this step, the transfer clutch torque setting unit 46 sets a transfer clutch torque Ttr by the equation (15), viz., Ttr−Tt.

When the torque down command by the traction control is not output to the engine control unit 32, the program advances to a step S113. In this step, the transfer clutch torque setting unit 46 sets a transfer clutch torque Ttr by using the equation (14), viz. Ttr=Tt+Ts+Ty.

When the program ends the setting of the transfer clutch torque Ttr in the step S109, S112 or S113, the program advances to a step S114. In the step, only when the program has executed the step S109, S112 or S113 in the first program execution, the transfer clutch torque setting unit 46 performs a first torque change processing of the equation (17), and sets a final transfer clutch torque Ttrs. And it outputs the resultant to the transfer clutch drive part 40*a*.

As described above, in the present embodiment, even if the braking force control unit 31 and the traction control unit 33 operate, the transfer clutch torque Ttr is set except only a torque component, which may interfere with those control quantities and the power distribution control is carried out. Accordingly, an optimum power distribution control is continued without any excessive interference with the braking force control unit 31 and the traction control unit 33, whereby an excellent drivability is maintained without giving the driver any uncomfortable feeling.

Specifically, the optimum power distribution, which is the primary advantageous feature of the 4-wheel drive, is maintained, and an excessive wheel slip is prevented by the braking force control and the traction control. Accordingly, an ideal running performance is exhibited. Improvements of the control are easily achieved by changing only the front/rear power distribution control, without changing the braking force control and the traction control. Further, when the braking force control and the traction control are active or not active, the transfer clutch torque Ttr is varied gently as designed. Accordingly, the vehicle characteristics variation caused when the front/rear power distribution is varied is also gentle. Accordingly, the control is natural and easy to be handled. The 4-wheel drive system as an object to be controlled may be the FF (FR) basis 4-wheel drive system having the differential mechanism or any other type of 4-wheel drive system, in addition to the FF basis 4-wheel drive system without the differential mechanism, which is used in the embodiment. In this respect, the invention is very versatile in use. Also when the invention is applied to another type of the 4-wheel drive system, the measure required is simply to change the control characteristics. In the embodiment, the vehicle motion control is described in two forms, the braking force control and the traction control. If required, either of them may be used. It is evident that the invention is likewise applied to any other vehicle motion control, e.g., rear-wheel steering control, right/left drive force distribution control or the like.

As seen from the foregoing description, even when the vehicle motion control device operates and controls a vehicle motion, and even when the vehicle motion control unit operates and performs a vehicle motion control, an optimum power distribution control is continued without any excessive interference with the vehicle motion control, whereby an excellent drivability is secured without giving the driver any uncomfortable feeling.

While there have been described in connection with the preferred embodiments of the invention, it will be obvious to those skilled in the art that various changes and modifications may be made therein without departing from the invention, and it is aimed, therefore, to cover in the ensuing claims all such changes and modifications as fall within the true spirit and scope of the invention.

What is claimed is:

1. A power distribution control system for a vehicle comprising:
    a vehicle motion controller for controlling a motion of the vehicle;
    a power distribution controller; and
    a variable capacity torque transmission clutch operated by an operating torque set by said power distribution controller;
    wherein said power distribution controller includes:
        first torque setting means for computing a torque-response-torque that is based on an input torque received from a drive source and distributed to the front and rear wheels;
        second torque setting means for computing a revolution-difference-response-torque based on a revolution-difference between a front shaft and a rear shaft; and
        operating torque setting means for computing said operating torque using at least said torque-response-torque and said revolution-difference-response-torque,
    wherein when said vehicle motion controller operates, said operating torque setting means computes said operating torque except said revolution-difference-response-torque.

2. A power distribution control system for a vehicle comprising:
    a vehicle motion controller for controlling a motion of the vehicle; and
    a variable capacity torque transmission clutch operated by an operating torque set by a power distribution controller;
    wherein said power distribution controller includes:
        first torque setting means for computing a torque-response-torque that is based on an input torque received from a drive source and distributed drive power to the front and rear wheels;
        second torque setting means for computing a revolution-difference-response-torque based on a revolution-difference between a front shaft and a rear shaft;
        yaw-rate feedback torque setting means for computing a yaw rate feedback torque based on a yawing state of the vehicle; and
        operating torque setting means for computing said operating torque using at least said torque-response-torque, said revolution-difference-response-torque and said yaw rate feedback torque,
    wherein when said vehicle motion control means operates, said operating torque setting means computes said operating torque except said revolution-difference-response-torque and said yaw rate feedback torque.

3. The power distribution control system for the vehicle as set forth in claim 1,
    wherein said vehicle motion controller controls a motion of the vehicle as intended by detecting a tendency of oversteer of the vehicle and a tendency of understeer of the vehicle, and
    said operating torque setting means computes said operating torque, when said vehicle motion control means operates, in such a manner that correction quantities based on the oversteer and understeer tendency are added to said operating torque.

4. The power distribution control system for the vehicle as set forth in claim 2,
    wherein said vehicle motion controller controls a motion of the vehicle as intended by detecting a tendency of oversteer of the vehicle and a tendency of understeer of the vehicle, and
    said operating torque setting means computes said operating torque, when said vehicle motion control means operates, in such a manner that correction quantities based on the oversteer and understeer tendency are added to said operating torque.

5. The power distribution control system for the vehicle as set forth in claim 3,
    wherein each said correction quantity is selected depending on at least either of a vehicle speed and a road surface friction coefficient.

6. The power distribution control system for the vehicle as set forth in claim 4,
    wherein each said correction quantity is selected depending on at least either of a vehicle speed and a road surface friction coefficient.

7. The power distribution control system for the vehicle as set forth in claim 1,
    wherein said operating torque setting means introduces a prescribed delay into a variation of said operating torque, when said operating torque is varied with the operation of said vehicle motion controller.

8. The power distribution control system for the vehicle as set forth in claims 2,
    wherein said operating torque setting means introduces a prescribed delay into a variation of said operating torque, when said operating torque is varied with the operation of said vehicle motion controller.

9. The power distribution control system for the vehicle as set forth in claim 3,
    wherein said operating torque setting means introduces a prescribed delay into a variation of said operating torque, when said operating torque is varied with the operation of said vehicle motion controller.

10. The power distribution control system for the vehicle as set forth in claim 4,
    wherein said operating torque setting means introduces a prescribed delay into a variation of said operating torque, when said operating torque is varied with the operation of said vehicle motion controller.

11. The power distribution control system for the vehicle as set forth in claim 5, wherein said operating torque setting means introduces a prescribed delay into a variation of said operating torque, when said operating torque is varied with the operation of said vehicle motion controller.

12. The power distribution control system for the vehicle as set forth in claim 6, wherein said operating torque setting means introduces a prescribed delay into a variation of said operating torque, when said operating torque is varied with the operation of said vehicle motion controller.

* * * * *